United States Patent

Miura et al.

[11] Patent Number: 5,910,562
[45] Date of Patent: Jun. 8, 1999

[54] COPOLYCARBONATE RESIN AND RESIN COMPOSITION COMPRISING THE SAME

[75] Inventors: Mitsuo Miura; Osamu Kondo; Takayasu Fujimori; Yoshinori Isahaya, all of Tsukuba, Japan

[73] Assignee: Mitsubishi Gas Chemical Company, Inc., Tokyo, Japan

[21] Appl. No.: 08/953,526

[22] Filed: Oct. 17, 1997

[30] Foreign Application Priority Data

| Oct. 18, 1996 | [JP] | Japan | 8-276260 |
| Feb. 6, 1997 | [JP] | Japan | 9-023902 |
| Feb. 6, 1997 | [JP] | Japan | 9-023903 |
| Mar. 12, 1997 | [JP] | Japan | 9-057727 |

[51] Int. Cl.$^6$ .................................................. C08G 64/00
[52] U.S. Cl. ............................ 528/201; 528/196; 528/198
[58] Field of Search ...................................... 528/201, 196, 528/198

[56] References Cited

FOREIGN PATENT DOCUMENTS

| 0 787 756 A2 | 8/1997 | European Pat. Off. |
| 63-035619 | 2/1988 | Japan . |

*Primary Examiner*—Terressa Mosley
*Attorney, Agent, or Firm*—Jones & Askew, LLP

[57] ABSTRACT

A copolycarbonate resin containing a structural unit derived from bisphenol A and a structural unit derived from 3,9-bis (2-hydroxy-1,1-dimethylethyl)-2,4,8,10-tetraoxaspiro[5,5] undecane or a composition comprising the copolycarbonate resin and an aromatic polycarbonate resin containing a structural unit derived from bisphenol A as a main structural unit is mixed with a release agent and/or an antioxidant as required and is injection-molded to obtain an optical molded article such as a plastic lens which is excellent in impact resistance and hue and well balanced between refractive index and dispersion.

18 Claims, No Drawings

COPOLYCARBONATE RESIN AND RESIN COMPOSITION COMPRISING THE SAME

BACKGROUND OF THE INVENTION

The present invention relates to a transparent polycarbonate resin which has impact resistance, a high refractive index and reciprocal dispersion value and a low photoelastic constant and is excellent in terms of heat resistance and hue, a production method for the same, a resin composition comprising the same and optical molded articles of the same.

Since a polycarbonate resin has excellent mechanical properties such as impact resistance and also excellent heat resistance and transparency, it is widely used in many fields as an engineering plastic. As it is excellent in transparency in particular, it is used in lenses, prisms, optical disk substrates and the like as a plastic optical material.

To produce the polycarbonate resin, there have been known such methods as one in which an aromatic dihydroxy compound such as bisphenol A and phosgene are reacted with each other directly in the presence of an acid coupling agent, one in which an aromatic dihydroxy compound such as bisphenol A and a carbonic acid diester such as diphenyl carbonate are polycondensed through an ester exchange reaction in a molten state, and the like.

In either one of the above methods, a polycarbonate resin comprising only bisphenol A as an aromatic dihydroxy compound has a large photoelastic constant and relatively low melt fluidity, a molded article thereof has a large birefringence. Although the polycarbonate resin has a high refractive index of 1.58, it has a low Abbe number indicative of dispersibility of 30, which is a substantive defect of the material together with the above birefringence problem. Therefore, it has such a defect that it has not so high performance to be widely used in optical recording materials, optical lenses and the like.

The present inventors previously made an invention which relates to a polycarbonate resin having a structural unit derived from bisphenol having a spiro-ring skeleton, a production method for the same and a resin composition comprising the same (Japanese Patent Application Laid-open Nos. 2-214721 (1990) and 4-8761 (1992)). However, the structural unit having a spiro-ring skeleton structure is derived from 3,9-bis[1,1-dimethyl-2-(4'-hydroxybenzoyloxy)ethyl]-2,4,8,10-tetraoxaspiro[5,5]-undecane, and the Abbe number of the polycarbonate resin is not satisfactory for use in optical lenses though it is better than that of a bisphenol A type polycarbonate.

SUMMARY OF THE INVENTION

The present invention has been made to solve the problems described above which are associated with the prior art. It is therefore an object of the present invention to provide a novel copolycarbonate resin which has excellent impact resistance, heat resistance and hue, is well balanced between refractive index and dispersibility, and further has a low photoelastic constant and birefringence as well as a production method for the same.

It is another object of the present invention to provide a resin composition which comprises the above novel copolycarbonate resin and has excellent releasability from a mold.

It is further another object of the present invention to provide a resin composition which comprises the above novel copolycarbonate resin and has excellent melt stability and whose coloration during residence at the time of molding is too little to mar outer appearance thereof.

It is still further another object of the present invention to provide a resin composition which comprises the above novel copolycarbonate resin and has improved impact resistance while maintaining a hue.

It is yet further another object of the present invention to provide an optical molded article which is molded of a material comprising the above novel copolycarbonate resin.

The novel copolycarbonate resin of the present invention comprises a unit represented by the general formula (1):

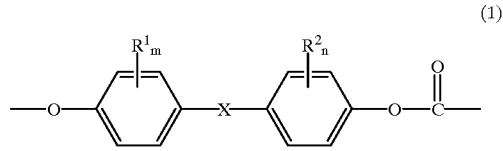

wherein, X is

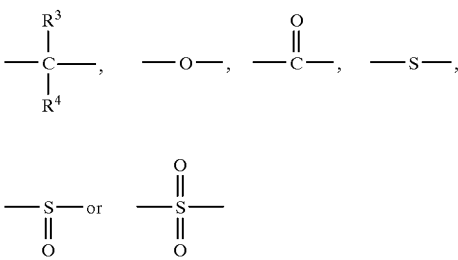

wherein $R^3$ and $R^4$ each are independently a hydrogen atom, an alkyl group having 1 to 10 carbon atoms or a phenyl group or $R^3$ and $R^4$ may be coupled to form a ring, $R^1$ and $R^2$ each are independently a hydrogen atom, an alkyl group having 1 to 10 carbon atoms or a halogen atom, and m and n each are independently an integer of 0 to 4 representing a number of substituent groups, and a unit represented by the general formula (2):

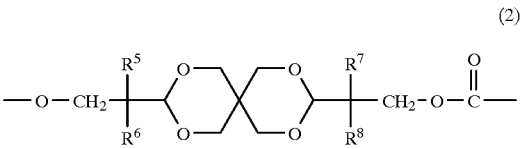

wherein, $R^5$, $R^6$, $R^7$ and $R^8$ each are independently a hydrogen atom or a monovalent alkyl group having 1 to 10 carbon atoms. If m is not less than 2 in the general formula (1), $R^1$ may be the same or different with each other. If n is not less than 2, $R^2$ may be the same or different with each other. The ring formed by coupling of $R^3$ and $R^4$ is preferably an cycloalkane ring having 5 to 12 carbon atoms.

The method for producing the copolycarbonate resin of the present invention comprises the step of melt-polycondensing an aromatic dihydroxy compound represented by the general formula (3):

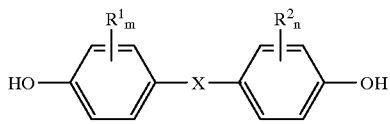

(3)

wherein, X is

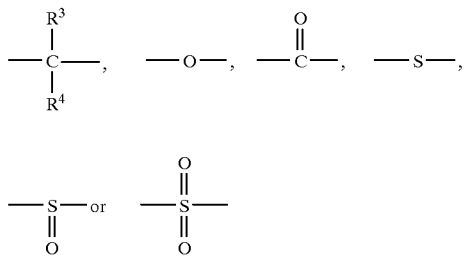

wherein $R^3$ and $R^4$ each are independently a hydrogen atom, an alkyl group having 1 to 10 carbon atoms or a phenyl group or $R^3$ and $R^4$ may be coupled to form a ring, $R^1$ and $R^2$ each are independently a hydrogen atom, an alkyl group having 1 to 10 carbon atoms or a halogen atom, and m and n each are independently an integer of 0 to 4 representing a number of substituent groups, an aliphatic dihydroxy compound represented by the general formula (4):

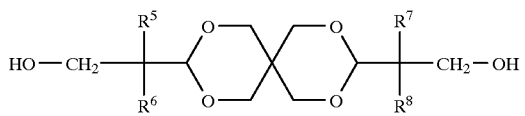

(4)

wherein, $R^5$, $R^6$, $R^7$ and $R^8$ each are independently a hydrogen atom or a monovalent alkyl group having 1 to 10 carbon atoms, and a carbonic acid diester in the presence of a basic compound catalyst. If m is not less than 2 in the general formula (3), $R^1$ may be the same or different with each other. If n is not less than 2, $R^2$ may be the same or different with each other. The ring formed by coupling of $R^3$ and $R^4$ is preferably an cycloalkane ring having 5 to 12 carbon atoms.

Since the above copolycarbonate resin of the present invention has excellent impact resistance, heat resistance and hue, and a low photoelastic constant, and is well balanced between refractive index and dispersibility, it can be widely used as an optical material.

As the copolycarbonate resin has relatively poor releasability from a mold, it tend to be not easy to remove a molding thereof from a mold efficiently without breaking it.

The present inventors have conducted intensive studies about the method for overcoming the above defect and have found that a polycarbonate resin composition obtained by mixing the copolycarbonate resin with a release agent has excellent releasability from a mold and a molding thereof can be removed from a mold efficiently without breaking it.

Thus, a first resin composition of the present invention is a polycarbonate resin composition comprising the copolycarbonate resin and at least one selected from the group consisting of polysiloxane-based silicone oils and fatty acid esters in an amount of 0.05 to 3 parts by weight based on 100 parts by weight of the copolycarbonate resin (the first resin composition is referred to as "resin composition A" hereinafter).

Further, as the copolycarbonate resin has relatively poor melt stability and may be colored yellow during residence at the time of molding, application thereof in such a field as optical lenses where great importance is attached to outer appearance may be restricted.

The present inventors have conducted intensive studies about the method for overcoming the above defect and have found that a polycarbonate resin composition obtained by mixing the copolycarbonate resin with an antioxidant has excellent melt stability and is colored too little to mar outer appearance thereof during residence at the time of molding.

Thus, a second resin composition of the present invention is a polycarbonate resin composition comprising the copolycarbonate resin and at least one selected from the group consisting of hindered phenol compounds, phosphorus compounds and thioether compounds in an amount of 0.001 to 0.5 part by weight based on 100 parts by weight of the copolycarbonate resin (the second resin composition is referred to as "resin composition B" hereinafter).

The present inventors have also found that a polycarbonate resin composition obtained by mixing the copolycarbonate resin with a release agent and an antioxidant is excellent in both releasability from a mold and melt stability.

Thus, a third resin composition of the present invention is a polycarbonate resin composition comprising the copolycarbonate resin, at least one selected from the group consisting of polysiloxane-based silicone oils and fatty acid esters in an amount of 0.05 to 3 parts by weight, and at least one selected from the group consisting of hindered phenol compounds, phosphorus compounds and thioether compounds in an amount of 0.001 to 0.5 part by weight based on 100 parts by weight of the copolycarbonate resin (the third resin composition is referred to as "resin composition C" hereinafter).

Further, to cause the copolycarbonate resin to exhibit higher impact resistance, a certain degree of high molecular weight is required for the copolycarbonate resin. To attain a high molecular weight, the polymerization temperature must be increased, whereby the obtained resin may be colored, which is a problem.

The present inventors have found that a resin composition obtained by mixing the copolycarbonate resin with an aromatic polycarbonate resin comprising a unit derived from an aromatic dihydroxy compound can exhibit higher impact resistance while maintaining a hue.

Thus, a fourth resin composition of the present invention is a polycarbonate resin composition comprising the copolycarbonate resin and an aromatic polycarbonate resin containing a unit represented by the above general formula (1) as a main structural unit (the fourth resin composition is referred to as "resin composition D" hereinafter).

The optical molded article of the present invention is preferably molded of the resin composition C or D and has a refractive index of 1.52 to 1.56 and an Abbe number of 35 to 50.

DETAILED DESCRIPTION OF THE INVENTION

The copolycarbonate resin, method of producing the same and resin composition comprising the same of the present invention are described in detail hereinafter.

(1) Copolycarbonate Resin

The copolycarbonate resin of the present invention contains a unit represented by the above general formula (1) (which may be referred to as "structural unit (1)" hereinafter) and a unit represented by the above general formula (2) (which may be referred to as "structural unit (2)" hereinafter) as structural units.

The above structural unit (1) is derived from an aromatic dihydroxy compound represented by the above general formula (3) and a carbonic acid diester, and the above structural unit (2) is derived from an aliphatic dihydroxy compound represented by the above general formula (4) and a carbonic acid diester.

Examples of the aromatic dihydroxy compound include bis(4-hydroxyphenyl)methane, 1,1-bis(4-hydroxyphenyl)ethane, 2,2-bis(4-hydroxyphenyl)propane, 2,2-bis(4-hydroxyphenyl)butane, 2,2-bis(4-hydroxyphenyl)octane, bis(4-hydroxyphenyl)-phenylmethane, 2,2-bis(4-hydroxy-3-methylphenyl)propane, 1,1-bis(4-hydroxy-3-t-butylphenyl)propane, 2,2-bis(4-hydroxy-3-bromophenyl)propane, 1,1-bis(4-hydroxyphenyl)cyclopentane, 1,1-bis(4-hydroxyphenyl)cyclohexane, 4,4'-dihydroxydiphenylether, 4,4'-dihydroxy-3,3'-dimethylphenylether, 4,4'-dihydroxyphenylsulfide, 4,4'-dihydroxy-3,3-dimethyldiphenylsulfide, 4,4'-dihydroxydiphenylsulfoxide, 4,4'-dihydroxy- 3,3'-dimethyldiphenylsulfoxide, 4,4-dihydroxydiphenylsulfone, 4,4'-dihydroxy-3,3'-dimethyldiphenylsulfone and the like.

Of those, 2,2-bis(4-hydroxyphenyl)propane, namely bisphenol A, or 1,1-bis(4-hydroxyphenyl)-cyclohexane are preferred.

Examples of the aliphatic dihydroxy compound include (3,9-bis(2-hydroxyethyl)-2,4,8,10-tetraoxaspiro-[5,5]undecane), (3,9-bis(2-hydroxy-1,1-dimethylethyl)-2,4,8,10-tetraoxaspiro[5,5]undecane), (3,9-bis(2-hydroxy-1,1-diethylethyl)-2,4,8,10-tetraoxaspiro[5,5]undecane), (3,9-bis(2-hydroxy-1,1-dipropylethyl)-2,4,8,10-tetraoxaspiro[5,5]undecane), and the like. Of those, (3,9-bis(2-hydroxy-1,1-dimethylethyl)-2,4,8,10-tetraoxaspiro[5,5]undecane) is preferred.

Since the copolycarbonate resin of the present invention is a copolymer comprising the above structural unit (1) and the above structural unit (2), it has excellent heat resistance and hue, is well balanced between refractive index and dispersibility and has a low birefringence. The copolymer may be either a random copolymer, block copolymer, alternating copolymer or a polymer comprising two or more thereof.

In the present invention, the molar ratio (1)/(2) of the above structural unit (1) to the above structural unit (2) is preferably 90/10 to 10/90, more preferably 80/20 to 20/80. That is, if the molar ratio of these structural units is smaller than 10/90, the heat resistance of the resulting resin composition may deteriorate and if it is larger than 90/10, the photoelastic constant and water absorption of the resulting resin composition may be high and the balance between refractive index and dispersion value may be worse. Thus, the resin composition is not preferred as an optical material.

The copolycarbonate resin of the present invention comprises the above structural unit (1) and the above structural unit (2) as main structural units (usually, not less than 80 mol %) and may contain a small amount of other structural unit (for example, derived from a dihydroxy compound such as tricyclodecane dimethanol, cyclohexane dimethanol, 2,2-bis(4-hydroxycyclohexyl)propane, hydroquinone, p,p'-biphenol, phenolphthalein or the like) to the extent that an advantage of the present invention is not lost.

The number average molecular weight of the copolycarbonate resin of the present invention is preferably 10,000 to 100,000, more preferably 10,000 to 40,000. (The number average molecular weight is a number average molecular weight in terms of polystyrene measured by GPC (Gel Permeation Chromatography) using chloroform as a solvent.) The weight average molecular weight of the copolycarbonate resin of the present invention is preferably 30,000 to 200,000, more preferably 50,000 to 120,000. (The weight average molecular weight is a weight average molecular weight in terms of polystyrene measured by GPC using chloroform as a solvent.)

The copolycarbonate resin of the present invention may contain a thermal stabilizer, hydrolytic stabilizer, antioxidant, pigment, dye, reinforcement, filler, ultraviolet absorber, lubricant, release agent, crystal nucleating agent, plasticizer, fluidity improving agent, antistatic agent and the like as required.

Each of these additives may be mixed into the copolycarbonate resin by conventionally known methods. For example, these components are dispersed and mixed by a high-speed mixer such as a tumbling mixer, Henschel mixer, ribbon blender, super mixer or the like and then melt-kneaded by an extruder. Banbury mixer, rolls or the like.

The copolycarbonate resin of the present invention is improved in terms of balance between refractive index and dispersion and photoelastic constant while maintaining excellent properties inherent to a polycarbonate resin such as impact resistance and heat resistance. Therefore, it can be advantageously used as an optical material which can provide plastic optical molded articles such as lenses, prisms and optical disk substrates. It can be particularly advantageously used as a molding material for plastic lenses. Injection molding, for example, is used to produce optical molded articles.

(2) Method For Producing Copolycarbonate Resin

The method for producing the copolycarbonate resin of the present invention includes the step of melt-polycondensing an aromatic dihydroxy compound represented by the above general formula (3), an aliphatic dihydroxy compound represented by the above general formula (4) and a carbonic acid diester through an ester exchange reaction in the presence of a basic compound catalyst.

Examples of the aromatic dihydroxy compound and the aliphatic dihydroxy compound as starting materials are compounds named above as the aromatic dihydroxy compound and the aliphatic dihydroxy compound from which the structural units of the copolycarbonate resin of the present invention can be derived, respectively.

Examples of the carbonic acid diester include diphenyl carbonate, ditolyl carbonate, bis(chlorophenyl)carbonate, m-cresyl carbonate, dinaphthyl carbonate, bis(diphenyl)carbonate, diethyl carbonate, dimethyl carbonate, dibutyl carbonate, dicyclohexyl carbonate and the like. Of those, diphenyl carbonate is particularly preferred.

The carbonic acid diester is preferably used in an amount of 0.97 to 1.30 moles, particularly preferably 0.99 to 1.10 moles based on 1 mole of the total of the aromatic dihydroxy compound and the aliphatic dihydroxy compound.

A basic compound is used as a catalyst in the method of the present invention. The basic compound includes an alkali metal compound and/or alkali earth metal compound, or nitrogen-containing compound.

The compound is preferably an organic acid salt, an inorganic acid salt, an oxide, a hydroxide, a hydrogenated product or an alcoholate of an alkali metal, an alkali earth metal or the like, a quaternary ammonium hydroxide, a salt thereof, an amine or the like. These compounds may be used alone or in combination of two or more.

Examples of the alkali metal compound include sodium hydroxide, potassium hydroxide, lithium hydroxide, cesium hydroxide, sodium bicarbonate, potassium bicarbonate, lithium bicarbonate, sodium carbonate, potassium carbonate, lithium carbonate, cesium carbonate, sodium acetate, potassium acetate, lithium acetate, cesium acetate, sodium stearate, potassium stearate, lithium stearate, cesium stearate, sodium borohydride, lithium borohydride, phenylated boron sodium, sodium benzoate, potassium benzoate, lithium benzoate, cesium benzoate, disodium hydrogen phosphate, dipotassium hydrogen phosphate, dilithium hydrogen phosphate, disodium phenylphosphate, dipotassium phenylphosphate, dilithium phenylphosphate, disodium salt, dipotassium salt, dilithium salt and dicesium salt of bisphenol A, sodium salt, potassium salt, lithium salt and cesium salt of phenol, and the like.

Examples of the alkali earth metal compound include calcium hydroxide, barium hydroxide, magnesium hydroxide, strontium hydroxide, calcium bicarbonate, barium bicarbonate, magnesium bicarbonate, strontium bicarbonate, calcium carbonate, barium carbonate, magnesium carbonate, strontium carbonate, calcium acetate, barium acetate, magnesium acetate, strontium acetate, calcium stearate, barium stearate, magnesium stearate, strontium stearate, and the like.

Examples of the nitrogen-containing compound include ammonium hydroxides having an alkyl, aryl or alkaryl group such as tetramethylammonium hydroxide, tetraethylammonium hydroxide, tetrapropylammonium hydroxide, tetrabutylammonium hydroxide and trimethylbenzylammonium hydroxide; tertiary amines such as trimethylamine, triethylamine, dimethylbenzylamine and triphenylamine; secondary amines such as dimethylamine and diethylamine; primary amines such as methylamine and ethylamine; imidazoles such as 2-methylimidazole and 2-phenylimidazole; basic salts such as ammonia, tetramethylammonium borohydride, tetrabutylammonium borohydride, tetrabutylammonium tetraphenylborate, tetramethylammonium tetraphenylborate; and the like.

The basic compound catalyst is used in an amount of $10^{-9}$ to $10^{-3}$ moles, preferably $10^{-7}$ to $10^{-5}$ moles based on 1 mole of the total of the aromatic dihydroxy compound and the aliphatic dihydroxy compound.

The melt polycondensation through an ester exchange reaction can be carried out by a known melt polycondensation method. That is, the above-described starting materials and catalyst are used and heated at a normal pressure or a reduced pressure to carry out an ester exchange reaction so as to melt-polycondensate these components while removing a by-product. The reaction is generally carried out in two or more stages.

Specifically, a first reaction is carried out at 120 to 260° C., preferably 180 to 240° C. for 0 to 5 hours, preferably 0.5 to 3 hours. Thereafter, the reaction temperature is raised while reducing the pressure of a reaction system to carry out a reaction among the aromatic dihydroxy compound, the aliphatic dihydroxy compound and the carbonic acid diester. In the final stage, a polycondensation reaction is carried out at a reduced pressure of not higher than 1 mmHg and a temperature of 200 to 300° C. This reaction may be carried out in a continuous or batch manner. A reactor used for the above reaction may be of either a tank type or an extrusion type.

The copolycarbonate resin of the present invention which is a product obtained after the completion of polymerization is preferably mixed with a catalyst deactivator to maintain heat stability and hydrolytic stability. For example, a known acidic substance is preferably added to deactivate the basic compound catalyst. Examples of the acidic substance include aromatic sulfonic acids such as p-toluenesulfonic acid; aromatic sulfonic acid esters such as butyl p-toluenesulfonate; organic halides such as stearoyl chloride, butyroyl chloride, benzoyl chloride, toluenesulfonic acid chloride and benzyl chloride; alkyl sulfates such as dimethyl sulfate; and the like.

The above acidic substance is added in an amount of 0.2 to 500 moles, preferably 1 to 30 moles per mole of the catalyst.

After the deactivation of the catalyst, there may be provided a step of evaporating and removing a low-boiling compound contained in the polymer at a pressure of 0.1 to 1 mmHg and a temperature of 200 to 300° C. For this purpose, a lateral or thin-layer evaporator equipped with a paddle blade, lattice blade or spectacle blade is preferably used.

The copolycarbonate resin of the present invention thus obtained can be mixed with an antioxidant, pigment, dye, reinforcement, filler, ultraviolet absorber, lubricant, release agent, crystal nucleating agent, plasticizer, fluidity improving agent, antistatic agent and the like in addition to the above heat stabilizer and hydrolytic stabilizer.

These additives can be each blended into the copolycarbonate resin by conventionally known methods. For example, these components are dispersed and mixed by a high-speed mixer such as a tumbling mixer, Henschel mixer, ribbon blender or super mixer and then melt-kneaded by an extruder, Banbury mixer, rolls or the like.

(3) Resin Composition

The copolycarbonate resin of the present invention is preferably mixed with a release agent to improve the releasability of a molding from a mold at the time of molding. The release agent is preferably a fatty acid ester-based release agent, silicone-based release agent or paraffin-based release agent. A fatty acid ester-based release agent or a silicone-based release agent is particularly preferred.

Examples of the fatty acid ester-based release agent include methyl oleate, isobutyl oleate, octyl oleate, lauryl oleate, oleyl oleate, myristyl myristate, stearyl stearate, 2-ethylhexyl oleate, decyl oleate, octyldodecyl oleate, octyldodecyl behenate, behenyl behenate, ethylene glycol monopalmitate, glycerine monostearate, pentaerythritol monopalmitate, pentaerythritol distearate and the like.

Examples of the silicone-based release agent include polysiloxane-based silicone oils. A preferred polysiloxane-based silicone oil is represented by the general formula (5):

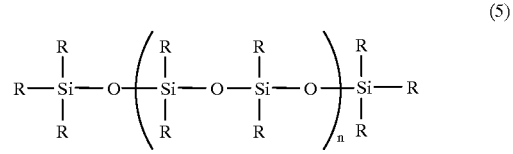

(5)

In the formula (5), R is a group selected from the group consisting of a hydrogen atom, a phenyl group and an alkyl group. When R is an alkyl group, the alkyl group preferably has 1 to 5 carbon atoms, such as methyl, ethyl or the like. Two or more groups out of these groups may be present in one molecule. In the formula (5), n is an integer of 1 or more, preferably 1 to 20, more preferably 1 to 10.

A polysiloxane-based silicone oil used as a release agent in the present invention may be a mixture of the polysiloxane-based silicone oils represented by the above general formula (5).

Examples of the paraffin-based release agent include natural and synthetic paraffins, polyethylene wax and the like.

The preferred resin composition (resin composition A) of the present invention is a composition comprising the above copolycarbonate resin and at least one compound selected from the group consisting of polysiloxane-based silicone oils and fatty acid esters as a release agent.

The proportion of the release agent is 0.05 to 3 parts by weight, preferably 0.1 to 1 part by weight based on 100 parts by weight of the above copolycarbonate resin. If the proportion is less than 0.05 part by weight, satisfactory releasability will not be obtained and if it is more than 3 parts by weight, a silver stripe will be generated in the molding or the impact resistance of the molding will be deteriorated disadvantageously. The above release agents may be used alone or in combination of two or more.

Since the resin composition A has excellent releasability between the molding and the mold, it makes it possible to mass-produce a molding efficiently without breaking or distorting the molding. It is particularly effective in the production of a molding by injection molding. In addition, impact resistance, a property inherent to the resin, is not impaired. Therefore, it can be used for a wide range of application such as a material for optical molded articles including optical disk substrates and optical lenses and useful industrially. Particularly, it is advantageously used in optical molded articles such as optical lenses obtained by injection molding.

The copolycarbonate resin of the present invention is preferably mixed with an antioxidant to improve the melt stability of the resin after the completion of a polymerization reaction. The antioxidant is at least one selected from the group consisting of hindered phenol compounds, phosphorus compounds and thioether compounds. That is, another preferred resin composition (resin composition B) of the present invention is a composition comprising the above copolycarbonate resin and at least one selected from the group consisting of hindered phenol compounds, phosphorus compounds and thioether compounds.

The hindered phenol compounds include, for example, 1,1,3-tris(2-methyl-4-hydroxy-5-t-butylphenyl)-butane, 4,4'-butylidenebis(3-methyl-6-t-butylphenol), n-octadecyl-3-(3',5'-di-t-butyl-4'-hydroxyphenyl)propionate, pentaerythrityl-tetrakis-(3-(3,5-di-t-butyl-4-hydroxyphenyl) propionate), triethyleneglycol-bis(3-(3-t-butyl-5-methyl-4-hydroxyphenyl)propionate), 1,6-hexanediol-bis(3-(3,5-di-t-butyl-4-hydroxyphenyl)propionate), 2,2'-methylenebis(4-methyl-6-t-butylphenol), 2,2'-methylenebis(4-ethyl-6-t-butylphenol), 2-t-butyl-6-(3-t-butyl-2-hydroxy-5-methylbenzyl)-4-methylphenyl acrylate, 2-(1-(2-hydroxy-3,5-di-t-pentylphenyl)ethyl)-4,6-di-t-pentylphenyl acrylate, 4,4-thiobis(3-methyl-6-t-butylphenol), 1,3,5-trimethyl-2,4,6-tris(3,5-di-t-butyl-4-hydroxybenzyl)benzene, 2,2-thiodiethylene-bis(3-(3,5-di-t-butyl-4-hydroxyphenyl) propionate, 3,9-bis(2-(3-(3-t-butyl-4-hydroxy-5-methylphenyl)-propionyloxy)-1,1-dimethyl)-2,4,8,10-tetraoxaspiro[5,5]undecane and the like.

The phosphorus compounds include, for example, phenyldiisodecyl phosphite, diphenylisodecyl phosphite, diphenylisooctyl phosphite, triphenyl phosphite, trisnonylphenyl phosphite, tricyclohexyl phosphite, tricresyl phosphite, tris-(2,4-di-t-butyl-phenyl)phosphite, tris(nonylphenyl) phosphite, bis(2,4-di-t-butylphenyl)pentaerythritol diphosphite, bis(2,6-di-t-butyl-4-methylphenyl) pentaerythritol diphosphite, 2,2-methylenebis(4,6-di-t-butylphenyl)-octyl phosphite, 4,4'-butylidenebis(3-methyl-6-t-butyl-phenyl-di-tridecyl phosphite), 4,4'-isopropylidenediphenol alkyl(C12~15) phosphite and the like.

The thioether-based compounds include, for example, dilauryl thiodipropionate, distearyl thiodipropionate, dimyristyl-3,3'-thiodipropionate, pentaerythritol tetrakis(β-laurylthiopropionate) and the like.

The antioxidant is used in a proportion of 0.001 to 0.5 part by weight, preferably 0.01 to 0.3 part by weight based on 100 parts by weight of the copolycarbonate resin. If the proportion is less than 0.001 part by weight, the antioxidant's effect of suppressing coloration during residence at the time of molding will not be seen and if the proportion is more than 0.5 part by weight, such problems as the coloration of the resin and a reduction in molecular weight will occur.

The above antioxidants may be used alone or in combination of two or more. Particularly, a combination of a hindered phenol compound and a phosphorus-based compound exhibits a marked effect of improving melt stability. When both a hindered phenol compound and a phosphorus compound are used, the weight ratio of the hindered phenol compound to the phosphorus compound is preferably 1/10 to 10/1, particularly preferably 1/5 to 5/1. The total adding amount of the hindered phenol compound and the phosphorus compound is preferably 0.001 to 0.5 part by weight, more preferably 0.01 to 0.3 part by weight based on 100 parts by weight of the copolycarbonate resin.

The resin composition B is colored too little to mar outer appearance thereof during molding because a radical derived from oxygen generated during residence at the time of molding or a radical derived from thermal decomposition is captured by the antioxidant. Therefore, it can be widely used in the field of optical lenses or the like where great importance is attached to outer appearance. It is particularly advantageously used in optical molded articles such as optical lenses and the like obtained by injection molding.

Further, in the present invention, a polycarbonate resin composition which is excellent both in releasability and melt stability can be obtained by using both the above release agent and the above antioxidant. That is, a more preferred resin composition of the present invention is a polycarbonate resin (resin composition C) comprising the above copolycarbonate resin, at least one selected from the group consisting of polysiloxane-based silicone oils and fatty acid esters, and at least one selected from the group consisting of hindered phenol compounds, phosphorus compounds and thioether compounds.

When both a release agent and an antioxidant are used, the release agent is used in an amount of 0.05 to 3 parts by weight, preferably 0.1 to 1 part by weight and the antioxidant is used in an amount of 0.001 to 0.5 part by weight, preferably 0.01 to 0.3 part by weight based on 100 parts by weight of the copolycarbonate resin.

As for the time when the release agent and the antioxidant are added, they may be added while the copolycarbonate resin obtained by melt polycondensation is still molten right after a reaction or after the copolycarbonate resin is pelletized. They may be added together with a catalyst deactivator or the like and may be added separately. When they are added to a molten resin right after a reaction, they are added to a resin removed from a reactor and the resulting mixture is supplied into a kneader to be kneaded uniformly and pelletized directly, or the resin removed from the reactor is supplied into a kneader and the release agent and the antioxidant are side-fed into the kneader to be kneaded uniformly and the resulting mixture is pelletized directly.

These substances may be added in the form of a masterbatch prepared in advance or a solution prepared by dissolving them in an organic solvent or water, or may be added directly without using the masterbatch or solvent.

The copolycarbonate resin of the present invention can be blended with other polycarbonate resin. A preferred polycarbonate resin to be mixed is an aromatic polycarbonate resin containing a unit represented by the above general formula (1) derived from an aromatic dihydroxy compound as a main structural unit. That is, another preferred resin composition of the present invention is a polycarbonate resin composition (resin composition D) comprising the copolycarbonate resin and an aromatic polycarbonate resin containing a unit represented by the above general formula (1) as a main structural unit.

In the resin composition D, the above copolycarbonate resin preferably contains a unit (structural unit (2)) represented by the above general formula (2) derived from an aliphatic dihydroxy compound in a molar fraction of 30% or more, more preferably 50% or more. If the molar fraction is less than 30%, the effect of improving optical properties such as photoelastic constant and Abbe number may be small.

Examples of the aromatic dihydroxy compound deriving the aromatic polycarbonate resin contained in the resin composition D are the same as those named for the aromatic dihydroxy compound deriving the structural unit (1) in a description of the above-mentioned copolycarbonate resin of the present invention. Of those examples, 2,2-bis(4-hydroxyphenyl)propane, namely bisphenol A, and 1,1-bis(4-hydroxyphenyl)cyclohexane are preferred and bisphenol A is particularly preferred. The molar fraction of the structural unit (1) in the aromatic polycarbonate resin is usually not less than 80%, and another structural unit, if any, may be a unit derived from another dihydroxy compound.

The number average molecular weight of the aromatic polycarbonate resin is preferably 10,000 to 35,000, more preferably 15,000 to 30,000. If the molecular weight is less than 10,000, impact resistance will be insufficient and if the molecular weight is more than 35,000, melt viscosity will be too high, making injection molding difficult disadvantageously.

In the resin composition D, the structure of the structural unit (1) constituting the aromatic polycarbonate resin and the structure of the structural unit (1) derived from the aromatic dihydroxy compound contained in the copolycarbonate resin may be the same or different.

The mixing weight ratio of the copolycarbonate resin to the aromatic polycarbonate resin is preferably 10:90 to 90:10. If the proportion of the aromatic polycarbonate resin contained in the resin composition D is less than 10 wt %, the impact resistance and heat resistance and the like of the aromatic polycarbonate resin will not be reflected on the resulting composition and the effect of addition will be weakened. If the proportion of the aromatic polycarbonate resin is more than 90 wt %, the effect of improving properties such as photoelastic constant and Abbe number which is the purpose of using the copolycarbonate resin cannot be fully obtained. If the proportion is within the above range, the amount of the aromatic polycarbonate resin added can be determined suitably in consideration of the physical properties of the copolycarbonate resin of the present invention to obtain a polycarbonate resin composition having desired physical properties.

Further, the molar ratio (1)/(2) of the structural unit (1) derived from the aromatic dihydroxy compound contained in the resin composition D to the structural unit (2) derived from the aliphatic dihydroxy compound is preferably 10/90 to 90/10, more preferably 20/80 to 80/20. In other words, the total proportion of the structural unit (1) contained in the copolycarbonate resin and the structural unit (1) contained in the aromatic polycarbonate resin is preferably 10 to 90 mol % based on the total of the structural units of the polycarbonate resin contained in the above resin composition.

If the molar ratio (1)/(2) is smaller than 10/90, thermal resistance will deteriorate. If the molar ratio is larger than 90/10, photoelastic constant and water absorption will increase and refractive index and dispersion value will not be well balanced. Therefore, the mixing ratio of the copolycarbonate resin to the aromatic polycarbonate resin contained in the resin composition D is preferably determined in consideration of the ratio of the structural units.

The copolycarbonate resin and the aromatic polycarbonate resin are mixed by known methods for producing a polymer alloy or a polymer blend, such as mechanical mixing, freeze-drying or spray-drying after dissolving in a common solvent, fine particle mixing and the like. From an economical point of view, the mechanical mixing method is the most advantageous and the most typical mechanical mixing method is melt mixing using a double screw extruder, single screw extruder, roll kneader, internal mixer or the like.

Also in the resin composition D, the catalyst is preferably removed or deactivated to maintain heat stability and hydrolytic stability like the copolycarbonate resin alone of the present invention, and the addition of the above catalyst deactivator is generally and preferably carried out.

The resin composition D may be mixed with an antioxidant, pigment, dye, reinforcement, filler, ultraviolet absorber, lubricant, release agent, crystal nucleating agent, plasticizer, fluidity improving agent, antistatic agent and the like as required. Further, to improve the characteristic properties of the resin, it may be blended with other polycarbonate resin or thermoplastic resin.

Preferably, the resin composition D can be mixed with the above release agent and/or antioxidant. Specifically, the resin composition D can be mixed with at least one release agent selected from the group consisting of the above polysiloxane-based silicone oils and fatty acid esters in an amount of 0.05 to 3 parts by weight, preferably 0.1 to 1 part by weight based on 100 parts by weight of the resin composition D. The resin composition D can be further mixed with at least one antioxidant selected from the group consisting of the above hindered phenol compounds, phosphorus compounds and thioether compounds in an amount of 0.001 to 0.5 part by weight, preferably 0.01 to 0.3 part by weight based on 100 parts by weight of the resin composition D. Further, the resin composition D can be mixed with at least one selected from the group consisting of the above polysiloxane-based silicone oils and fatty acid esters in an amount of 0.05 to 3 parts by weight, preferably 0.1 to 1 part by weight and at least one selected from the group consisting of the above hindered phenol compounds, phosphorus compounds and thioether compounds in an amount of 0.001 to 0.5 part by weight, preferably 0.01 to 0.3 part by weight.

The resin composition D has improved balance between refractive index and dispersion, photoelastic constant and the like while maintaining excellent characteristic properties such as impact resistance and heat resistance inherent to a polycarbonate resin. Therefore, it can be advantageously used as an optical material which can provide plastic optical molded articles such as lenses, prisms, and optical disk substrates. To mold optical molded articles, for example, injection molding or the like is used.

(4) Optical Molded Articles

The optical molded article of the present invention is preferably molded of the above resin composition C or D and has a refractive index of 1.52 to 1.56 and an Abbe number of 35 to 50. In other wards, the optical molded article of the present invention is excellent in balance between refractive index and dispersion. These values are measured by an Abbe refractometer.

The optical molded article of the present invention is improved in terms of hue, photoelastic constant and the like while maintaining excellent characteristic properties such as impact resistance and heat resistance inherent to molded articles of a polycarbonate resin. Preferably, the optical molded article has a photoelastic constant of 10 to 40 dyne/cm$^2$, a yellowness index (YI value) of 0.5 to 2 and a falling ball impact value of from 150 to more than 535 g. The yellowness index is a value measured by a color difference meter (TC-1800MK2 of Tokyo Denshoku Co.), the photoelastic constant is a value calculated by measuring birefringence caused by a load change at a wavelength of 633 nm using a 100 μm-thick cast film with an ellipsometer, and the falling ball impact value is a value indicative of the weight of a steel ball when a 40 mmØ×3.0 mm test sample is broken by the steel ball falling from a distance of 127 cm.

Examples of the optical molded article include plastic lenses for spectacles, plastic lenses for optical equipment such as cameras, prisms, optical disk substrates and the like. The optical molded article is preferably a plastic lens, particularly preferably a plastic lens for correction glasses. A molding method for these optical molded articles is not particularly limited but is preferably injection molding.

EXAMPLES

To further illustrate the present invention, and not by way of limitation, the following examples are given.

Example 1

22.8 g (0.10 mole) of 2,2-bis(4-hydroxyphenyl)-propane, 30.4 g (0.10 mole) of 3,9-bis(2-hydroxy-1,1-dimethylethyl)-2,4,8,10-tetraoxaspiro[5,5]undecane (may be referred to as "SPG" or "spiroglycol" hereinafter), 43.3 g (0.202 mole) of diphenyl carbonate and 6.0×10$^{-7}$ moles of sodium bicarbonate were charged into a 300 cc four-necked flask equipped with a stirrer and a distillation unit, heated at 180° C. in a nitrogen atmosphere and stirred for 30 minutes.

Thereafter, the pressure was adjusted to 150 mmHg and the temperature was raised to 200° C. at a rate of 60° C./hr at the same time, and an ester exchange reaction was carried out while that temperature was maintained for 40 minutes. After the temperature was further elevated to 225° C. at a rate of 75° C./hr and maintained at that temperature for 10 minutes, the pressure was reduced to 1 mmHg or less over 1 hour. The reaction was carried out for a total of 6 hours under agitation. After the reaction, nitrogen was blown into the reactor to return the pressure to a normal level and the produced polycarbonate resin was taken out.

The measurement results of the physical properties of the obtained copolycarbonate resin are shown in Table 1. $^1$H-NMR spectral and infrared absorption spectral data of the copolycarbonate resin are shown below.

(infrared absorption spectrum) 3020, 1600, 1500 cm$^{-1}$: aromatic ring 2852 cm$^{-1}$: acetal methylene group 2970, 1477, 1370 cm$^{-}$: methyl and methylene groups ($^1$H-NMR spectrum) 1.0 ppm: CH$_3$ of a group coupled to a spiro ring: 12.2 H 1.7 ppm: CH$_3$ of bisphenol A: 6.4H 3.3 to 4.6 ppm: CH$_2$ and CH of spiro ring: 14.2 H 7.0 to 7.3 ppm: H of an aromatic group: 8.7 H The above proton ratio coincides with a proton ratio of 12:6:14:9 which is calculated from used monomers.

Example 2

The operation of Example 1 was repeated except that 18.3 g (0.08 mole) of 2,2-bis(4-hydroxyphenyl)-propane and 36.5 g (0.12 mole) of 3,9-bis(2-hydroxy-1,1-dimethylethyl)-2,4,8,10-tetraoxaspiro[5,5]undecane were used. The measurement results of the physical properties of the obtained copolycarbonate resin are shown in Table 1.

Example 3

The operation of Example 1 was repeated except that 32.0 g (0.14 mole) of 2,2-bis(4-hydroxyphenyl)-propane and 18.3 g (0.06 mole) of 3,9-bis(2-hydroxy-1,1-dimethylethyl)-2,4,8,10-tetraoxaspiro[5,5]undecane were used. The measurement results of the physical properties of the obtained copolycarbonate resin are shown in Table 1.

Example 4

The operation of Example 1 was repeated except that 26.8 g (0.10 mole) of 1,1-bis(4-hydroxyphenyl)-cyclohexane and 30.4 g (0.10 mole) of 3,9-bis(2-hydroxy-1,1-dimethylethyl)-2,4,8,10-tetraoxaspiro[5,5]undecane were used. The measurement results of the physical properties of the obtained copolycarbonate resin are shown in Table 1.

Comparative Example

The operation of Example 1 was repeated except that 45.7 g (0.20 mole) of 2,2-bis(4-hydroxyphenyl)-propane was used and 3,9-bis(2-hydroxy-1,1-dimethylethyl)-2,4,8,10-tetraoxaspiro[5,5]undecane was not used. The measurement results of the physical properties of the obtained copolycarbonate resin are shown in Table 1.

The physical properties shown in Table 1 were measured in accordance with the following methods.

Average molecular weight: measured by CPC using chloroform as a solvent and represented as a number average molecular weight in terms of polystyrene Tg: glass transition temperature, measured by a differential scanning calorimeter Td: onset temperature of thermal decomposition, measured by a thermobalance when a 0.1% weight reduction occurs in a nitrogen stream Refractive index: measured by an Abbe refractometer Abbe number: measured by an Abbe refractometer Photoelastic constant: calculated by measuring birefringence caused by a load change at a wavelength of 633 nm using a 100 μm-thick cast film with an ellipsometer Falling ball impact value: represented as a weight of a steel ball when a 40 mmØ×3.0 mm test sample is broken by the steel ball falling from a distance of 127 cm

TABLE 1

|  | Example 1 | Example 2 | Example 3 | Example 4 | Comparative Example |
|---|---|---|---|---|---|
| SPG (mole %) | 50 | 60 | 30 | 50 | 0 |
| Number average molecular weight | 20000 | 21000 | 14000 | 16000 | 20000 |
| Tg (°C.) | 120 | 115 | 126 | 129 | 148 |
| Td (°C.) | 323 | 320 | 330 | 325 | 445 |
| Refractive index | 1.524 | 1.513 | 1.546 | 1.533 | 1.586 |
| Abbe number | 38 | 40 | 34 | 37 | 30 |
| Photoelastic constant × 10$^{-13}$ dyne/cm$^2$ | 26 | 23 | 49 | 25 | 78 |
| Falling ball impact value (g) | 150 | 50 | 60 | 50 | 60 |

Examples 5 to 11

1,484 g (6.5 moles) of 2,2-bis(4-hydroxyphenyl)-propane, 1,978 g (6.5 moles) of 3,9-bis(2-hydroxy-1,1-dimethylethyl)-2,4,8,10-tetraoxaspiro[5,5]undecane, 2,849 g (13.3 moles) of diphenyl carbonate and 3.27×10$^{-3}$ g (3.9×10$^{-5}$ moles) of sodium bicarbonate were charged into a 12-liter reactor equipped with a stirrer and a distillation unit and maintained at 215° C. and 760 mmHg in a nitrogen atmosphere for 2 hours, and the pressure was adjusted to 150 mmHg. After an elapse of 1 hour in this state, the pressure was reduced to 0.6 mmHg over 2 hours and the temperature was raised to 260° C. over 1 hour while this pressure was maintained, and a reaction was carried out under agitation for a total of 9 hours.

After the completion of the reaction, nitrogen was blown into the reactor to return the pressure to a normal level, the polycarbonate was pulled out from the bottom of the reactor by a gear pump, supplied to a double screw extruder (barrel temperature of 240° C.) and kneaded with 0.08 g of n-butyl p-toluenesulfonate to prepare a uniform polymer, and the resulting polymer was let pass through a die to be formed into a strand and cut into pellets by a pelletizer. The obtained copolycarbonate resin had a Mw (weight average molecular weight) of 74,700 and the yield of pellets was 3,320 g.

The same reaction as described above was carried out in a total of 25 batches, a total of 83 kg of pellets having an Mw of 74,000 to 75,000 was obtained, and uniform mixing was carried out by a blender.

The substances shown in Table 2 were uniformly kneaded with the obtained copolycarbonate resin by an extruder (the amounts shown in Table 2 are based on 100 parts by weight of the copolycarbonate resin). The resulting polymer was let pass through a die to be formed into a strand and cut into pellets by a pelletizer. The measurement results of the physical properties of the obtained resin composition are shown in Table 2. In Table 2, the silicone oil SH556 as an additive is silicone oil manufactured by Toray Dow Corning Co.

It is understood from Table 2 that resin compositions (Examples 5 to 8) comprising a copolycarbonate resin and a specified amount of a release agent had improved releasability while retaining impact resistance inherent to a polycarbonate resin.

Examples 12 to 16

The substances shown in Table 3 were added to the polycarbonate resins obtained in Examples 5 to 8 in proportions shown in Table 3 based on 100 parts by weight of the polycarbonate resins and uniformly kneaded by an extruder, and the resulting polymers were let pass through a die to be formed into a strand and cut into pellets by a pelletizer. The measurement results of the physical properties of the obtained resin compositions are shown in Table 3.

In Table 3, Adecastab AO-50 is n-octadecyl-3-(3',5'-di-t-butyl-4'-hydroxyphenyl)propionate of Asahi Denka Co., and Adecastab 2112 is tris(2,4-di-t-butylphenyl) phosphite of Asahi Denka Co. The YI value is a measurement value after a heat melt test.

It is understood from Table 3 that the resin compositions (of Examples 12 to 14) comprising a copolycarbonate resin with specified amounts of a release agent and an antioxidant had improved releasability and hue while retaining impact resistance inherent to a polycarbonate resin.

The measurement methods of physical properties shown in Tables 2 and 3 are as follows.

(1) Molecular weight: measured as a molecular weight (weight average molecular weight: Mw) calculated in terms of polystyrene using GPC (Shodex GPC System 11). Chloroform was used as a developing solvent.
(2) Release resistance value: A mirror polished mold from which a lattice-like molded article was obtained was set in an injection molding machine to detect a load applied to a projecting pin when the molded article is released from the mold as a release resistance value (unit: kg). The measurement conditions include a cylinder temperature of 260° C. and a mold temperature of 90° C.
(3) Falling ball impact strength: A disk having a diameter of 50 mm and a thickness of 3 mm was formed by injection molding. A steel ball was dropped on this disk from a height of 1.27 m by itself and the falling ball impact strength was measured as the maximum weight of the steel ball which did not break the disk.
(4) Heat melt test: 7 g of a polycarbonate resin composition was charged into a test tube and heated at 275° C. for 1 hour to be molten while nitrogen was flown into the test tube at a rate of 20 ml/min.
(5) Hue: 4 g of a polycarbonate resin composition after a heat at melt test was dissolved in 25 ml of methylene chloride and measured for its YI value (yellowness index) by a color difference meter (TC-1800MK2 of Tokyo Denshoku Co.).

TABLE 2

| | Additive | Parts by weight | Release resistance value (kg) | Falling ball impact strength (g) | Mw |
|---|---|---|---|---|---|
| Example 5 | silicone oil SH556 | 0.3 | 150 | >530 | 74000 |
| Example 6 | silicone oil SH556 | 2 | 130 | >530 | 74100 |
| Example 7 | glycerine monostearate | 0.3 | 160 | >530 | 74200 |
| Example 8 | glycerine monostearate | 2 | 130 | >530 | 74000 |
| Example 9 | not added | — | 290 | >530 | 74200 |
| Example 10 | silicone oil SH556 | 4 | 120 | 215 | 74000 |
| Example 11 | silicone oil SH556 | 0.03 | 280 | 280 | 74000 |

TABLE 3

| | Additive | Parts by weight | Release resistance value (kg) | Falling ball impact strength (g) | YI value | Mw |
|---|---|---|---|---|---|---|
| Example 12 | Adecastab AO-50 | 0.02 | 150 | >530 | 0.73 | 74200 |
| | silicone oil SH556 | 0.3 | | | | |
| Example 13 | Adecastab 2112 | 0.02 | 150 | >530 | 0.65 | 74000 |
| | silicone oil SH556 | 0.3 | | | | |
| Example 14 | Adecastab AO-50 | 0.02 | 150 | >530 | 0.54 | 74000 |
| | Adecastab 2112 | 0.02 | | | | |
| | silicone oil SH556 | 0.3 | | | | |
| Example 15 | not added | — | 290 | >530 | 1.60 | 74200 |
| Example 16 | Adecastab 2112 | 0.8 | 120 | 45 | 1.58 | 70600 |
| | silicone oil SH556 | 4 | | | | |

Example 17

A molten copolycarbonate resin synthesized from 1,484 g (6.5 moles) of 2,2-bis(4-hydroxyphenyl)propane, 1,978 g (6.5 moles) of 3,9-bis(2-hydroxy-1,1-dimethylethyl)-2,4,8,10-tetraoxaspiro[5,5]undecane, 2,849 g (13.3 moles) of diphenyl carbonate and $3.27 \times 10^{-3}$ g ($3.9 \times 10^{-5}$ moles) of sodium bicarbonate in the same manner as in Examples 5 to 11 was kneaded with 0.08 g of n-butyl p-toluenesulfonate and 0.66 g of tris(2,4-di-t-butylphenyl) phosphite by a double screw extruder (barrel temperature of 240° C.) and the resulting polymer was pelletized. The obtained pellet copolycarbonate resin had an Mw (weight average molecular weight) of 74,300 and the yield of pellets was 3,320 g.

The pellet had an YI value of 0.45. A heat melt test was carried out on the pellet in the same manner as in Examples 12 to 16 and the yellowness index of the resin after the test was measured. The resin was found to have a YI value of 0.55 and an Mw of 71,000.

Example 18

The operation of Example 17 was repeated except that 0.66 g of n-octadecyl-3-(3',5'-di-t-butyl-4'-hydroxyphenyl)propionate was blended in place of 0.66 g of tris(2,4-di-t-butylphenyl) phosphate. The obtained pellet had an Mw of 74,000 and the yield of pellets was 3,350 g. The pellet had a YI value of 0.45 and the resin after a heat melt test had an YI value of 0.64 and an Mw of 72,400.

Example 19

The operation of Example 17 was repeated except that 0.66 g of n-octadecyl-3-(3',5'-di-t-butyl-4'-hydroxyphenyl)propionate were blended in addition on to 0.08 g of n-butyl p-toluenesulfonate and 0.66 g of tris(2,4-di-t-butylphenyl) phosphite. The obtained pellet had an Mw of 74,500 and the yield of pellets was 3,340 g. The pellet had a YI value of 0.45 and the resin after a heat melt test had a YI value of (0.52 and an Mw of 71,100.

Example 20

The operation of Example 17 was repeated except that 0.02 g of n-octadecyl-3-(3',5'-di-t-butyl-4'-hydroxyphenyl)propionate was blended in place of 0.66 g of tris(2,4-di-t-butylphenyl) phosphite. The obtained pellet had an Mw of 74,400 and the yield of pellets was 3,320 g. The pellet had a YI value of 0.45 and the resin after a heat melt test had a YI value of 1.52 and an Mw of 70,600.

Example 21

The operation of Example 17 was repeated except that the amount of tris(2,4-di-t-butylphenyl) phosphite to be blended was changed from 0.66 g to 20 g. The obtained pellet had an Mw of 73,000 and the yield of pellets was 3,360 g. The pellet had a YI value of 0.51 and the resin after a heat melt test had a YI value of 2.68 and an Mw of 62,900.

It is understood from Examples 17 to 21 that resin compositions comprising a mixture of the copolycarbonate resin of the present invention and a specified amount of an antioxidant (Examples 17 to 19) are greatly improved in terms of hue.

Example 22

891.4 g (3.90 moles) of 2,2-bis(4-hydroxyphenyl)propane, 2,769 g (9.10 moles) of 3,9-bis(2-hydroxy-1,1-dimethylethyl)-2,4,8,10-tetraoxaspiro[5,5]undecane (spiroglycol), 2,847 g (13.29 moles) of diphenyl carbonate and $3.90 \times 10^{-5}$ moles of sodium bicarbonate were charged into a 12-liter nickel reactor equipped with a stirrer and a distillation unit, heated at 180° C. in a nitrogen atmosphere and stirred for 30 minutes.

Thereafter, the pressure was adjusted to 150 mmHg and the temperature was raised to 200° C. at a rate of 60° C./hr at the same time, and an ester exchange reaction was carried out while that temperature was maintained for 40 minutes. After the temperature was further elevated to 260° C. at a rate of 75° C./hr and maintained at that temperature for 10 minutes, the pressure was reduced to 1 mmHg or less over 1 hour. After a full vacuum degree was reached, a reaction was carried out under agitation for 5 hours, nitrogen was blown into the reactor after the completion of the reaction to return the pressure to a normal level, and the produced copolycarbonate resin was taken out. This resin had a Tg of 116° C., a refractive index nD of 1.505, an Abbe number υD of 42, a falling ball impact value of 31.6 g and a number average molecular weight Mn of 29,000.

33 parts by weight of an aromatic polycarbonate resin (bisphenol A type polycarbonate; number average molecular weight Mn of 24,000) [Iupilon S-2000 of Mitsubishi Gas Chemical Co.] was mixed with 100 parts by weight of the thus obtained copolycarbonate resin, and 0.08 g of butyl p-toluenesulfonate as a catalyst deactivator, 0.66 g of n-octadecyl-3-(3',5'-di-t-butyl-4'-hydroxyphenyl)propionate and 0.66 g of tris(2,4-di-t-butylphenyl) phosphite as antioxidants were blended and melt-kneaded using a double screw extruder. The molar ratio of a structural unit derived from bisphenol A to a structural unit derived from spiroglycol contained in the obtained resin composition was 50:50 when these substances were mixed in this ratio.

Since the obtained resin composition was achromatic and transparent and had a single glass transition temperature of 122° C., measured by a differential scanning calorimeter, it was confirmed that the above substances are compatible with one another to give a homogeneous material. The physical properties of this polycarbonate resin composition are shown in Table 4.

As is evident from Table 4, this resin composition has a high falling ball impact value, an improved Abbe number and photoelectric constant which are defects of a bisphenol A type polycarbonate resin and an excellent hue.

Example 23

62 parts by weight of an aromatic polycarbonate resin (bisphenol A type polycarbonate; number average molecular weight Mn of 24,000) [Iupilon S-2000 of Mitsubishi Gas Chemical Co.] was blended with 100 parts by weight of the copolycarbonate resin obtained by the same operation as in Example 22, 0.08 g of butyl p-toluenesulfonate as a catalyst deactivator, 0.66 g of n-octadecyl-3-(3',5'-di-t-butyl-4'-hydroxyphenyl)propionate and 0.66 g of tris(2,4-di-t-butylphenyl) phosphite as antioxidants were blended and melt-kneaded with a double screw extruder. The molar ratio of a structural unit derived from bisphenol A to a structural unit derived from spiroglycol contained in the obtained resin composition was 60:40 when these substances were mixed in this ratio.

As the obtained resin composition was achromatic and transparent and has a single glass transition temperature of 123° C., measured by a differential scanning calorimeter, it was confirmed that these substances were compatible with one another to give a homogeneous material. The physical properties of this polycarbonate resin composition are shown in Table 4.

Example 24

1,485.7 g (6.50 moles) of bisphenol A, 1,977.9 g (6.50 moles) of spiroglycol, 2,847 g (13.29 moles) of diphenyl carbonate and 3.90×10⁻⁵ moles of sodium bicarbonate were charged into a 12-liter nickel reactor equipped with a stirrer and a distillation unit, heated at 180° C. in a nitrogen atmosphere and stirred for 30 minutes. Thereafter, the pressure was adjusted to 150 mmHg and the temperature was raised to 200° C. at a rate of 60° C./hr and maintained at that temperature for 40 minutes to carry out an ester exchange reaction.

After the temperature was further elevated to 235° C. at a rate of 75° C./hr and maintained at that temperature for 10 minutes, the pressure was reduced to 1 mmHg or less over 1 hour. After a full vacuum degree was reached, a reaction was carried out under agitation for 5 hours. After the reaction, nitrogen was blown into the reactor to return the pressure to a normal level and the produced copolycarbonate resin was taken out. The molar ratio of a structural unit derived from bisphenol A to a structural unit derived from spiroglycol contained in this copolymer was 50:5 and this composition had a number average molecular weight Mn of 22,000. The physical properties of this composition are shown in Table 4. This composition is superior to the compositions of Examples 22 and 23 in hue and optical properties but inferior in falling ball impact value at 173 g.

Example 25

The operation of Example 24 was repeated except that the final polymerization temperature was set to 260° C. to obtain a copolymer of bisphenol A and spiroglycol. The physical properties of this resin are shown in Table 4. The resin had a high falling ball impact value but was colored compared with the resins of Examples 22 and 23.

Example 26

The operation of Example 22 was repeated to synthesize a copolycarbonate resin having a Tg of 116° C., a refractive index nD of 1.505, an Abbe number υD of 42, a falling ball impact value of 31.6 g and a number average molecular weight Mn of 29,000. To this resin, an aromatic polycarbonate resin (bisphenol A type polycarbonate; number average molecular weight Mn of 24,000) [Iupilon S-2000 of Mitsubishi Gas Chemical Co.] was added in an amount of 10 parts by weight based on 100 parts by weight of this resin and melt-kneaded with a double screw extruder to obtain a polycarbonate resin composition. As for the physical properties of the resin composition, as shown in Table 4, the resin composition had lower Tg and refractive index than those of the resin compositions of Examples 22 and 23.

Example 27

891.4 g (3.90 moles) of 2,2-bis(4-hydroxyphenyl) propane, 2,769 g (9.10 moles) of spiroglycol, 2,847 g (13.29 moles) of diphenyl carbonate and 3.90×10⁻⁵ moles of sodium bicarbonate were charged into a 12-liter nickel reactor equipped with a stirrer and a distillation unit, heated at 180° C. in a nitrogen atmosphere and stirred for 30 minutes.

Thereafter, the pressure was adjusted to 150 mmHg and the temperature was raised to 200° C. at a rate of 60° C./hr at the same time and maintained at that temperature for 40 minutes to carry out an ester exchange reaction. After the temperature was further elevated to 260° C. at a rate of 75° C./hr and maintained at that temperature for 10 minutes, the pressure was reduced to 1 mmHg or less over 1 hour. After a full vacuum degree was reached, a reaction was carried out under agitation for 5 hours. After the reaction, nitrogen was blown into the reactor to return the pressure to a normal level and the produced copolycarbonate resin was taken out. As shown in Table 4, this resin had lower Tg, refractive index and falling ball impact value than those of the resin compositions of Examples 22 and 23.

The physical properties shown in Table 4 were measured in accordance with the following methods.

Average molecular weight: measured by GPC using chloroform as a solvent and represented as a number average molecular weight in terms of polystyrene Tg: glass transition temperature measured by a differential scanning calorimeter Refractive index: measured by an Abbe refractometer Abbe number: measured by an Abbe refractometer Photoelastic constant: calculated by measuring birefringence caused by a load change at a wavelength of 633 nm using a 100-μm-thick cast film with an ellipsometer Falling ball impact value: represented as a weight of a steel ball when a 40 mmØ×3.0 mm test sample is broken by the steel ball falling from a distance of 127 cm YI value (yellowness index): a 50 mmØ×2.0 mm test sample is measured by the color analyzer of Nippon Denshoku Kogyo Co.

TABLE 4

|  | Example 22 | Example 23 | Example 24 | Example 25 | Example 26 | Example 27 |
|---|---|---|---|---|---|---|
| Number average molecular weight | 26000 | 24000 | 22000 | 24000 | 27000 | 29000 |
| Tg (°C.) | 122 | 126 | 122 | 123 | 118 | 116 |
| Refractive index | 1.523 | 1.530 | 1.523 | 1.523 | 1.510 | 1.505 |
| Abbe number | 38 | 37 | 38 | 38 | 41 | 42 |
| Photoelastic constant × 10⁻¹³ dyn/cm² | 26 | 38 | 26 | 26 | 20 | 10 |
| Falling ball impact value (g) | >535 | >535 | 173 | >535 | >535 | 31.6 |
| Yellowness index (YI value) | 1.94 | 1.70 | 1.58 | 4.47 | 2.40 | 2.61 |

As is evident from Table 4, the resin composition of the present invention has a high falling ball impact value and an improved Abbe number and photoelastic constant which are weak points of a bisphenol A type polycarbonate resin and is excellent in hue.

What is claimed is:

1. A copolycarbonate resin comprising, as structural units, a unit represented by the general formula (1):

(2)

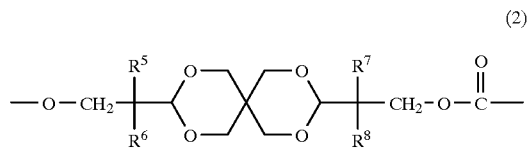

wherein X is

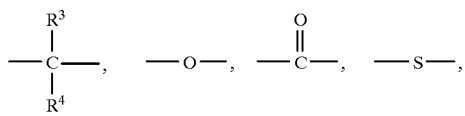

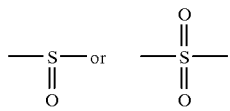

wherein $R^3$ and $R^4$ each are independently a hydrogen atom, an alkyl group having 1 to 10 carbon atoms or a phenyl group or $R^3$ and $R^4$ may be coupled to form a ring, $R^1$ and $R^2$ each are independently a hydrogen atom, an alkyl group having 1 to 10 carbon atoms or a halogen atom, and m and n each are independently an integer of 0 to 4 representing a number of substituent groups, and a unit represented by the general formula (2):

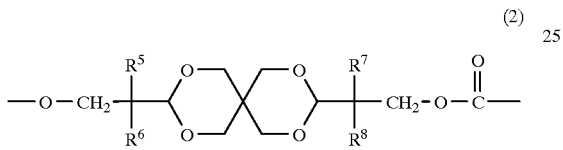

(2)

wherein $R^5$, $R^6$, $R^7$ and $R^8$ each are independently a hydrogen atom or a monovalent alkyl group having 1 to 10 carbon atoms, and wherein a molar ratio of the unit represented by the general formula (1) to the unit represented by the general formula (2) is 90/10 to 10/90.

2. The copolycarbonate resin according to claim 1, wherein $R^5$, $R^6$, $R^7$ and $R^8$ in the general formula (2) each are a methyl group.

3. The copolycarbonate resin according to any one of claims 1–2 which is an optical material.

4. The copolycarbonate resin according to claim 3 which is a plastic lens material.

5. A method for producing a copolycarbonate resin, which comprises the step of melt-polycondensing an aromatic dihydroxy compound represented by the general formula (3):

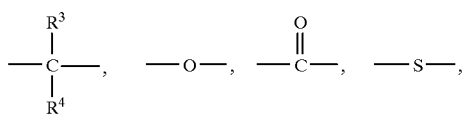

(3)

wherein, X is

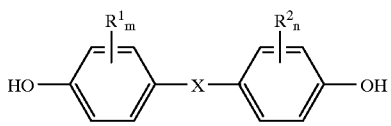

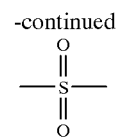

wherein $R^3$ and $R^4$ each are independently a hydrogen atom, an alkyl group having 1 to 10 carbon atoms or a phenyl group or $R^3$ and $R^4$ may be coupled to form a ring, $R^1$ and $R^2$ each are independently a hydrogen atom, an alkyl group having 1 to 10 carbon atoms or a halogen atom, and m and n each are independently an integer of 0 to 4 representing a number of substituent groups;

an aliphatic dihydroxy compound represented by the general formula (4):

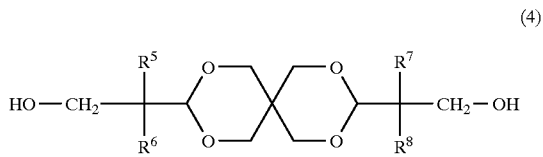

(4)

wherein $R^5$, $R^6$, $R^7$ and $R^8$ each are independently a hydrogen atom or a monovalent alkyl group having 1 to 10 carbon atoms, wherein a molar ratio of the aromatic dihydroxy compound to the aliphatic dihydroxy compound is 90/10 to 10/90; and a carbonic acid diester, in the presence of a basic compound catalyst.

6. The method for producing a copolycarbonate resin according to claim 5, wherein the basic compound catalyst is used in an amount of $10^{-9}$ to $10^{-3}$ moles based on 1 mole of the total of the aromatic dihydroxy compound and the aliphatic dihydroxy compound.

7. The method for producing a copolycarbonate resin according to claim 5, wherein $R^5$, $R^6$, $R^7$ and $R^8$ in the general formula (4) each are a methyl group.

8. A polycarbonate resin composition comprising the copolycarbonate resin as defined in claim 1 and at least one selected from the group consisting of polysiloxane-based silicone oils and fatty acid esters in an amount of 0.05 to 3 parts by weight based on 100 parts by weight of the copolycarbonate resin.

9. A polycarbonate resin composition comprising the copolycarbonate resin as defined in claim 1 and at least one selected from the group consisting of hindered phenol compounds, phosphorus compounds and thioether compounds in an amount of 0.001 to 0.5 part by weight based on 100 parts by weight of the copolycarbonate resin.

10. The polycarbonate resin composition according to claim 9, which further comprises a hindered phenol compound and a phosphorus compound in a total amount of 0.001 to 0.5 part by weight based on 100 parts by weight of the copolycarbonate resin.

11. A polycarbonate resin composition comprising the copolycarbonate resin as defined in claim 1, at least one selected from the group consisting of polysiloxane-based silicone oils and fatty acid esters in an amount of 0.05 to 3 parts by weight and at least one selected from the group consisting of hindered phenol compounds, phosphorus compounds and thioether compounds in an amount of 0.001 to 0.5 part by weight based on 100 parts by weight of the copolycarbonate resin.

12. A polycarbonate resin composition comprising the copolycarbonate resin as defined in claim 1 and an aromatic polycarbonate resin containing a unit represented by the general formula (1) as a main structural unit:

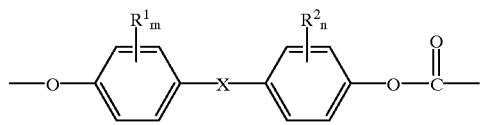
(1)

wherein X is

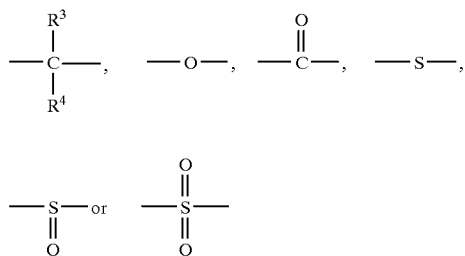

wherein $R^3$ and $R^4$ each are independently a hydrogen atom, an alkyl group having 1 to 10 carbon atoms or a phenyl group or $R^3$ and $R^4$ may be coupled to form a ring, $R^1$ and $R^2$ each are independently a hydrogen atom, an alkyl group having 1 to 10 carbon atoms or a halogen atom, and m and n each are independently an integer of 0 to 4 representing a number of substituent groups.

13. The polycarbonate resin composition according to claim 12, wherein a proportion of the aromatic polycarbonate resin is 10 to 90 wt % of the resin composition.

14. The polycarbonate resin composition according to claim 12, wherein a total proportion of the unit of the general formula (1) contained in the copolycarbonate resin and the unit of the general formula (1) contained in the aromatic polycarbonate resin is 10 to 90 mole % of the total of the structural units of the polycarbonate resin contained in the resin composition.

15. The polycarbonate resin composition according to any one of claims 10–14, which is an optical material.

16. The polycarbonate resin composition according to claim 15, which is a plastic lens material.

17. An optical molded article molded of the polycarbonate resin composition as defined in any one of claims 10–14, said optical molded article having a refractive index of 1.52 to 1.56 and an Abbe number of 35 to 50.

18. The optical molded article according to claim 17, which is a plastic lens.

* * * * *

UNITED STATES PATENT AND TRADEMARK OFFICE
CERTIFICATE OF CORRECTION

PATENT NO. : 5,910,562

DATED : June 8, 1999

INVENTOR(S) : Mitsuo Miura; Osamu Kondo; Takayasu Fujimori; Yoshinori Isahaya, It is certified that error appears in the above-identified patent and that said Letters Patent is hereby corrected as shown below:

In Claim 1, following line 2, delete the formula denoted "(2)" and replace therefor the following formula "(1)":

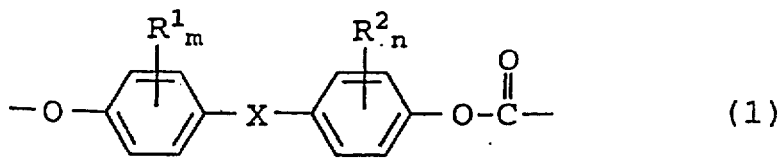

(1)

Signed and Sealed this

Eighth Day of August, 2000

*Attest:*

Q. TODD DICKINSON

*Attesting Officer*  Director of Patents and Trademarks